(12) United States Patent
Juan

(10) Patent No.: US 8,250,261 B2
(45) Date of Patent: Aug. 21, 2012

(54) APPLICATION METHOD FOR UNIVERSAL SERIAL BUS FILE TRANSFER DEVICE

(75) Inventor: Shih-Chou Juan, Jungli (TW)

(73) Assignee: Ours Technology Inc., Jubei, Hsinchu (TW)

( * ) Notice: Subject to any disclaimer, the term of this patent is extended or adjusted under 35 U.S.C. 154(b) by 856 days.

(21) Appl. No.: 10/635,549

(22) Filed: Aug. 7, 2003

(65) Prior Publication Data

US 2004/0230708 A1    Nov. 18, 2004

(30) Foreign Application Priority Data

May 13, 2003    (TW) ............................... 92113004 A

(51) Int. Cl.
*G06F 13/12*    (2006.01)
(52) U.S. Cl. .................. 710/62; 710/8; 710/15; 710/36; 710/72; 713/1
(58) Field of Classification Search ...................... 710/33
See application file for complete search history.

(56) References Cited

U.S. PATENT DOCUMENTS

| | | | |
|---|---|---|---|
| 6,370,603 B1* | 4/2002 | Silverman et al. ............. | 710/72 |
| 7,108,191 B2 | 9/2006 | Andrus | |
| 7,367,513 B2 | 5/2008 | Andrus | |
| 2002/0162009 A1* | 10/2002 | Shmueli et al. ............... | 713/200 |
| 2003/0097351 A1* | 5/2003 | Rothschild et al. ............ | 707/1 |
| 2003/0099147 A1* | 5/2003 | Deng et al. ................. | 365/230.05 |
| 2003/0167376 A1* | 9/2003 | Koh ............................. | 711/115 |
| 2003/0212841 A1* | 11/2003 | Lin ............................... | 710/62 |
| 2003/0226015 A1* | 12/2003 | Neufeld et al. ............... | 713/166 |
| 2004/0001088 A1* | 1/2004 | Stancil et al. ................ | 345/748 |
| 2004/0103223 A1* | 5/2004 | Gabehart et al. .............. | 710/2 |
| 2004/0127254 A1* | 7/2004 | Chang .......................... | 455/557 |
| 2004/0193744 A1* | 9/2004 | Paley et al. .................. | 710/5 |
| 2005/0083741 A1* | 4/2005 | Chang et al. ................. | 365/200 |
| 2006/0081716 A1 | 4/2006 | Andrus | |
| 2007/0023529 A1 | 2/2007 | Andrus | |
| 2007/0260998 A1* | 11/2007 | Levine et al. ................ | 715/789 |
| 2008/0222313 A1 | 9/2008 | Andrus et al. | |

* cited by examiner

*Primary Examiner* — Alan Chen
(74) *Attorney, Agent, or Firm* — Alston & Bird LLP

(57) ABSTRACT

The present invention discloses an application method for universal serial bus (USB) file transfer device. When USB file transfer device is connected between two computers loaded with operating such systems as Window, Mac, Linux, etc., that support Mass Storage Class standard while the USB file transfer device also supports Mass Storage Class, either computer can access system information provided in the USB file transfer device. Since the application program is stored in the USB file transfer device and the USB file transfer device is simulated as an auto-run storage device, such as a floppy disc drive, a hard disc drive or a CD-ROM drive, etc., the USB file transfer device in the present invention is capable of carrying out file transfers automatically without having to install drivers and programs. To users, the application method for USB file transfer device offers plug and play capabilities as file transfers can be performed automatically between two computers without having to install drivers and programs in either computer.

8 Claims, 3 Drawing Sheets

APPLICATION METHOD FOR UNIVERSAL SERIAL BUS FILE TRANSFER DEVICE

BACKGROUND OF THE INVENTION

1. Field of Invention

The present invention relates to an application method for universal serial bus (hereafter USB) file transfer device and, in particular, relates to one that, on a mass storage class platform, transfers files between computers without having to install programs.

2. Description of Related Art

Normally, data transmission between two computers can be achieved via the application of floppy disks or storage devices (CD-ROM, MO or Zip), direct cable connection cable (LL3/LI5 cable), LAN (local area network) and USB file transfer device, etc.

The disadvantage of using floppy discs is the small storage space and slow transmission rate. A floppy disc provides the memory capacity of 1.44 MB. When transferring files greater than 1.44 MB, one has to transfer files in multiple diskettes, often with the aid of multiple compressions. When transferring large amount of data via storage devices such as CD-ROM, MO or ZIP, files in computer A have to be stored on a storage media (CD, MO or ZIP) by a storage device (CD-RW drive, MO or ZIP) connected with computer A before being copied over to computer B by a storage device (CD-ROM drive, MO or ZIP) connected with computer B. This process of course is inefficient.

Using LL3/LL5 cable has the advantage of not having to transfer through a storage media. However, the drawbacks are three-fold: slow transmission speed (230 Kbps), occupation of parallel port and short effective transmission distance. Although it is convenient to utilize network cable via LAN for data transmission, there is limitation to the environment that it can operate. Data transmission between computers requires the link-up of network card and network cable. Unlike office users, home users are usually not equipped with LAN environment, unless the family has more than three computers, wherein a LAN-connected area can then be set up. Nowadays, it is common for families to own both notebook and desktop computer; and it would be difficult if sizable data transfers between two computers are not carried out via LAN. This problem can be overcome by prior art application of USB file transfer device. The prior art application method for USB file transfer device requires the installation of drivers in both computers in order to facilitate data transfer. This would not pose much problem in domestic use, as it is not inconvenient for a user to install drivers on both computers. When a visitor (sales personnel or application engineer) pays a visit to a customer and wishes to transfer large amounts of data, both computers (visitor's and customer's) must first be installed with drivers before utilizing prior art application method for USB file transfer device. This often becomes troublesome for both parties, thus its practicality being greatly discounted. Hence, the equipment vendors have a job cut out for them and that is to come up with solutions for resolving this problem.

We first describe the procedure of installing drivers when utilizing prior art application method for USB file transfer device. Most USB file transfer devices support NDIS environment. FIG. 1 illustrates a scenario, which begins with a USB file transfer device being connected with the USB port in computer A (See step 30), followed by the Windows 2000 operating system in computer A receiving a plug and play signal (See step 31).

If the operating system is not loaded with a USB file transfer device driver (See step 32), a query window will appear inquiring a user whether to proceed with the installation of the driver following the insertion of manufacturer's CD. Unless a driver has already been installed, the user will install the driver before a USB device is established (See step 33).

Suppose a driver has already been installed, the USB device will be detected by the operating system and no further installation will be required (See step 38). Then upon inserting manufacturer's CD, a query window will appear inquiring whether an application program has been installed (See Step 34). Unless an application program has already been installed, the user will install the application program as required (See step 35). Suppose an application program has already been installed, no further installation will be required (See step 39). Rebooting both computers following installations, either computer can now access information on the new peripheral device (USB file transfer device) (See step 36) and enable the application programs for file transfers (See step 37). It is noted that both computers have to be installed with a driver and an application program according to steps shown in FIG. 1 before utilizing prior art application method for USB file transfer device. In other words, computer B wanting to transfer files with the computer A has to undergo the same installation procedures as shown in the flowchart. That means when a visitor wishes to transfer sizable amounts of data between his and customer's computer, he must always bring with him drivers and application programs provided by prior art USB file transfer device manufacturer and carry out the installation of the driver and application program before utilizing prior art application method for USB file transfer device.

Aiming to improve prior art USB file transfer device as described above, the present invention discloses a novel USB file transfer device, capable of supporting the Mass Storage Class standard that stores the driver and application program within itself in such a way that the USB file transfer device is simulated as an auto-run storage device, such as a floppy disc drive, a hard disk drive or a CD-ROM drive. Hence, the USB file transfer device in the present invention is capable of carrying out file transfers automatically without having to install drivers and programs. To users, the application method for USB file transfer device in the present invention offers plug and play capabilities as file transfers can be performed automatically between two computers without having to install drivers and programs in either computer.

SUMMARY OF THE INVENTION

The main objective of the present invention is to provide an application method for USB file transfer device wherein file transfers can be performed automatically by self-enabling its built-in application program without having to install drivers and programs in either computer.

Another objective of the present invention is to provide an application method for USB file transfer device wherein, like the USB file transfer device, operating systems such as Windows, Mac, Linux, etc., support the Mass Storage Class standard. Thus, computers loaded with any of these operating systems can automatically access system information provided in the USB file transfer device and take control of the operation of the peripheral device (i.e., USB file transfer device) without having to install drivers and programs in either computer.

A further objective of the present invention is to provide an application method for USB file transfer device wherein the USB file transfer device can be simulated as an auto-nm storage device, such as a floppy disc drive, a hard disc drive or a CD-ROM drive, etc. Thus, file transfer can be performed automatically by self-enabling its built-in application program without having to install drivers and programs in either computer.

First, computer C equipped with the driver of the standard USB Mass Storage Class can automatically access system information provided in the USB file transfer device and take control of the operation of the peripheral device (i.e., USB file transfer device) such that the operating system loaded in computer C can self-install the driver of the standard USB Mass Storage Class without having to install drivers and programs in computer C.

Likewise, when the USB file transfer device is connected to a USB port of computer D, computer D, which is equipped with the driver of the standard USB Mass Storage Class, can automatically access system information provided in the USB file transfer device and take control of the operation of the peripheral device (i.e., USB file transfer device) such that the operating system loaded in computer D can self-install the driver of the standard USB Mass Storage Class without having to install drivers and programs in computer D.

Since drivers have been installed in computer C and D, the USB file transfer device can be simulated as an auto-run storage device, such as a floppy disc drive, a hard disc drive or a CD-ROM drive, etc. File transfers can thus be carried out automatically by self-enabling its built-in application program so that users do not have to install drivers and programs in computer C and computer D. Therefore, the application method for USB file transfer device in the present invention offers plug and play capabilities as file transfers can be performed automatically between two computers without having to install drivers and programs in either computer.

DESCRIPTION OF THE PREFERRED EMBODIMENTS

The present invention aims to provide plug and play solutions for resolving problems of utilizing prior art application method for USB file transfer device.

Capable of supporting the Mass Storage Class standard, the USB file transfer device disclosed in the present invention stores the driver and application program within itself in such a way that the USB file transfer device is simulated as an auto-run storage device, such as a floppy disc drive, a hard disk drive or a CD-ROM drive. Like the USB file transfer device, operating systems such as Windows, Mac, Linux, etc., support the Mass Storage Class standard. Thus, computers loaded with any of the operating systems are equipped with standard storage driver in compliance with the USB Mass Storage Class and can automatically access system information provided in the USB file transfer device and take control of the operation of the peripheral device (i.e., USB file transfer device). Being simulated as an auto-run storage device, such as a floppy disc drive, a hard disk drive or a CD-ROM drive, etc., the USB file transfer device in the present invention is capable of carrying out file transfers automatically without having to install drivers and programs. To users, the application method for USB file transfer device in the present invention offers plug and play capabilities as file transfers can be performed automatically between two computers without having to install drivers and programs in either computer.

Flowcharts are being provided in order to illustrate the procedures in accordance with the present invention. Supporting the Mass Storage Class standard, the USB file transfer device in the present invention carries out file transfers between computer by utilizing its built-in application programs and the default drivers in the operating system. If computer C (the master) as shown in FIG. 2 utilizes Microsoft Windows 2000 operating system, Mass Storage Class is provided as a common standard. When a USB file transfer device in the present invention is connected with a USB port of computer C (See step 41), the operating system in computer C will automatically detect whether it is a Mass Storage Class USB device (See step 42). Being a Mass Storage Class USB device, the USB file transfer device in the present invention is able to utilize default USB drivers provided in Windows 2000 as drivers for its USB file transfer device.

Users will be informed by the operating system of the existence of a USB file transfer device so that re-installation is not required and Windows 2000 can access information in the USB file transfer device. Taking only seconds to complete, driver installation and program execution are carried out automatically without further instructions.

When the USB file transfer device is connected with computer D (the remote), application program in USB file transfer device will be automatically executed, thereby facilitating file transfers (See step 45).

Similarly, when the USB file transfer device is connected with a USB port of computer D (the remote), the USB file transfer device will automatically install drivers in computer D (See steps 41.fwdarw.42.fwdarw.43). The above embodiment illustrates the installation procedure under Windows 2000 operating system between the computers C and D. Application of the present invention includes such operating systems as Windows, Mac and Linux, etc. so long as these operating systems have Mass Storage Class as a common standard. Moreover, the present invention is not limited to computers loaded with those operating systems listed above. Any electronic data storage apparatus loaded with any of the operating systems that support Mass Storage Class, can benefit from the application method disclosed in the present invention.

For those operating systems that do not support Mass Storage Class (e.g., Windows 98 operating system), extra steps are required to manually install the driver. We now illustrate the installation procedures in a scenario when neither of the operating systems, connected by the USB file transfer device according to the present invention, supports Mass Storage Class. The installation procedures also apply when either of the operating systems does not support Master Storage Class. The installation procedures are as follows. When an USB file transfer device connects with the USB port of computer C, the master, (See step 41), the operating system will detect whether it is a Mass Storage Class USB device (See step 42). Not having Mass Storage Class as a common standard, Windows 98 only detects a USB device and a plug & play signal is promptly displayed (See step 46). Installation of USB device drivers (see step 47) by a storage medium (such as a CD) is required in order to drive the USB file transfer device as set forth in the embodiment. Suppose a USB file transfer device has been installed, the operating system will inform users and as such, no further installation will be required.

Similarly, when the USB file transfer device is connected with a USB port of computer D (the remote), the USB file transfer device will automatically install drivers in computer D (See steps 41.fwdarw.42.fwdarw.46.fwdarw.47). Once the USB file transfer device is installed between computer C and D, application program in USB file transfer device will be automatically executed (See step 44), thereby facilitating file transfers (See step 45).

As shown in FIG. 3, the main inventiveness in the present invention is providing a controller 140, having a storage device 130 therein, in USB file transfer devices such that suitable application program and firmware, both supporting Mass Storage Class, are being provided in the storage device 130. As such, the USB file transfer device can utilize the default drivers in the operating system. Since the USB file transfer device is simulated as an auto-run storage device, such as a floppy disc drive, a hard disk drive or a CD-ROM drive, having built-in auto-run file like auto.run, the USB file transfer device can automatically execute application programs. That means users can execute application programs and carry out file transfers without bothering with installation procedures. FIG. 3 is the functional block diagram for a USB file transfer device, wherein computer C and D are connected with a controller 140 via cable 110 and 220, respectively. The controller 140 comprises a microprocessor 120 and a storage device 130. Comprising an ALU (arithmetic logical unit), a device controller, etc. (not shown), the microprocessor 120 reads and accesses information being transferred via cable 110/220. Being a memory for temporarily storing application program and firmware, the storage device 130 can be one of the four types of memory (flash memory, EPROM, EEPROM and ROM [MASK ROM]), or any two of those four types of memory. It can be the combination of a flash memory, an EEPROM and ROM or a flash memory, an EPROM and a ROM. Different methods are used to program different types of memory. Software is normally used to control flash memory while burning is used to program EPROM or EEPROM. In a preferred embodiment of the present invention, application program and firmware are built-ins in the memory as mentioned above. Therefore, file transfers between two computers, being linked according to the present invention, are not different from those between two computers in a LAN environment. By eliminating manual installation procedures associated with prior art application method; the present invention offers the benefit of utilizing USB file transfer devices as long as operating systems involved support Mass Storage Class. Taking only seconds to complete, driver installation and program execution in the present invention are carried out automatically without manual installation procedures.

Since USB file transfer device offers such advantages as compatibility, high speed, convenience and unlimited capacity, all current computer systems support USB. USB 2.0 standard currently available offers 480 Mbps (bit per sec), thus suitable for transferring sizable amount of information. As a matter of fact, USB has become the most common interface among modem electronic storage devices. Being simulated as an auto-run storage device (floppy disc drive, hard disc drive and CD-ROM drive etc.), the USB file transfer device in the present invention enables files transfers to be carried out automatically by self-enabling its built-in application program without having to install drivers and programs in either computer. To users, the application method for USB file transfer device in the present invention offers plug and play capabilities as file transfers can be performed automatically between two computers without having to install drivers and programs in either computer. In the wake of the present invention, notebooks can be regarded as a removable disk with immense storage capacity.

The above embodiments are intended for describing the present invention without limiting the scope that the present invention may be applied. Modifications made in accordance with the disclosures of the present invention without departing from the spirits of the present invention are covered by the equivalents of the present invention.

Figure 1:
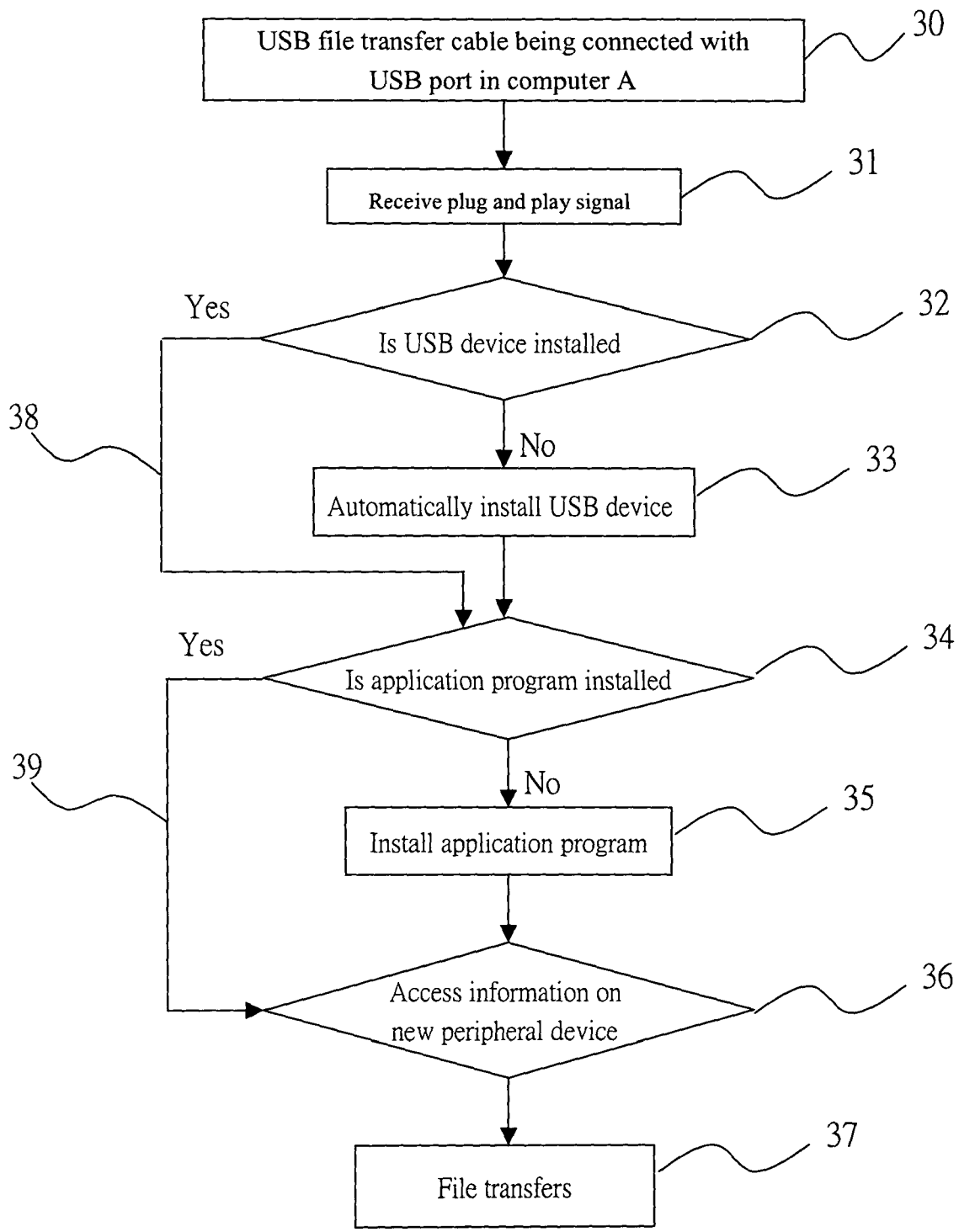
FIG. 1 is a flowchart for the installation of prior art USB file transfer device between computer A and computer B.
Figure 2:
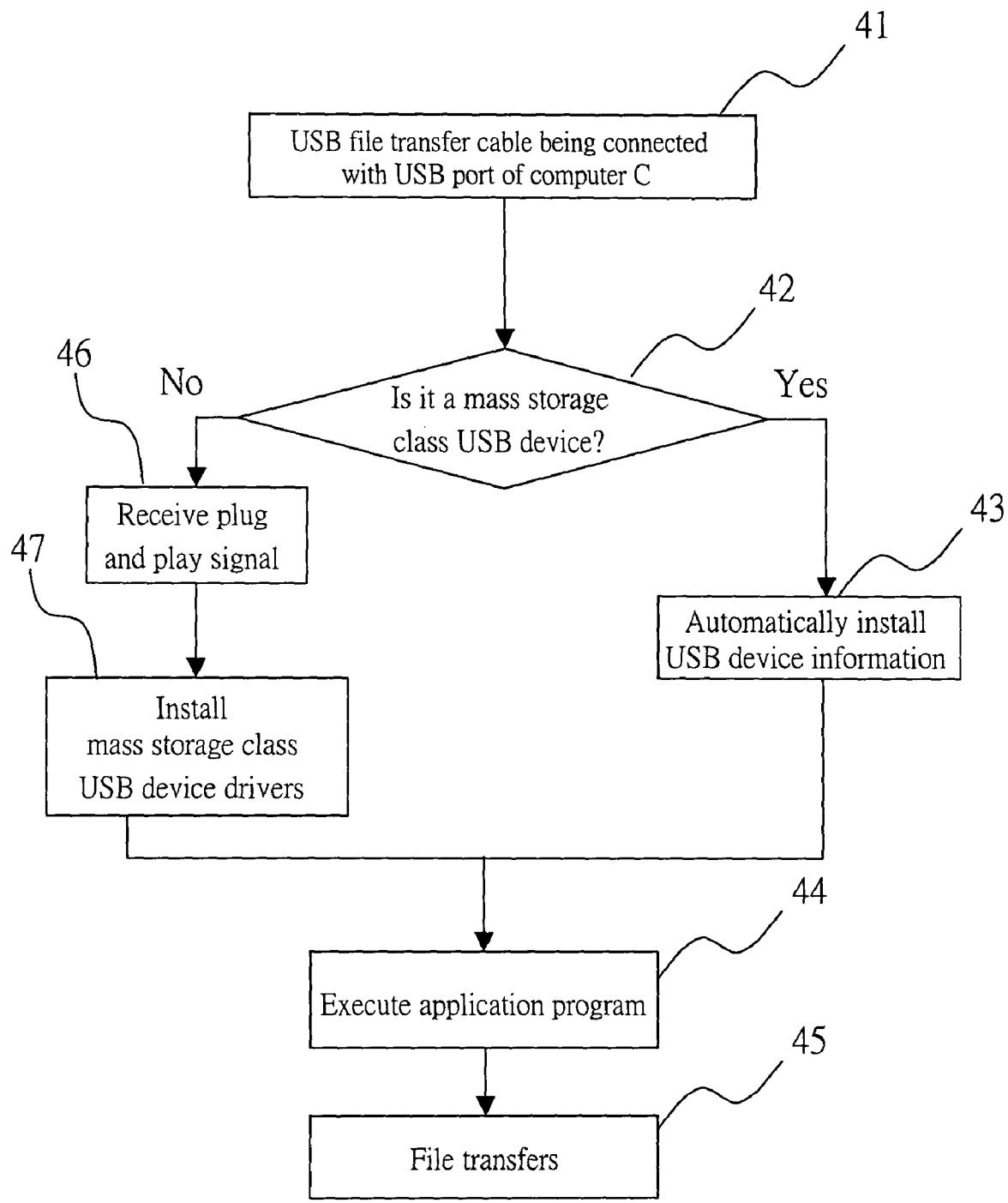
FIG. 2 is a flowchart for the installation of USB file transfer device between computer C and computer D according to the present invention.
Figure 3:
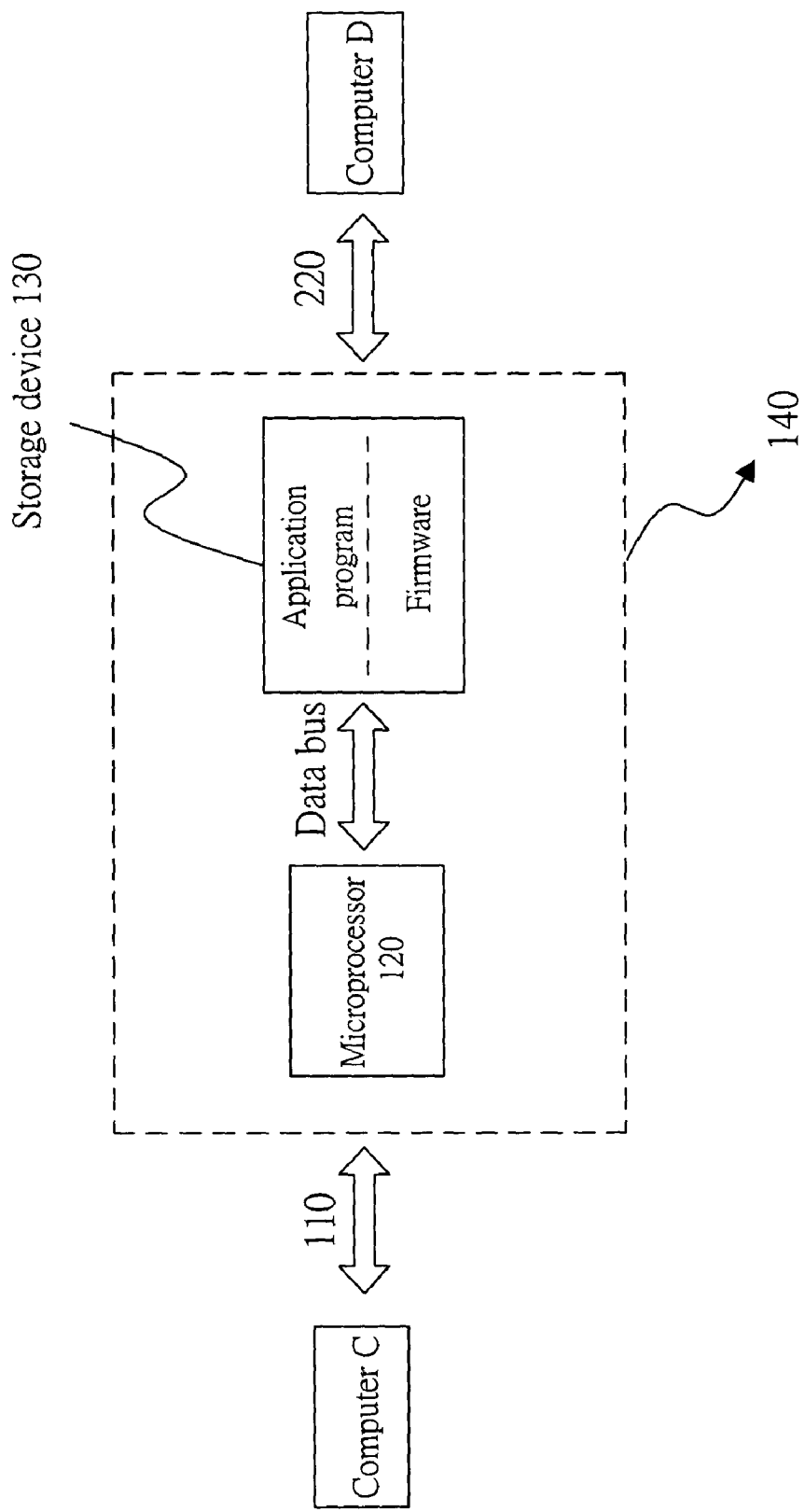
FIG. 3 is a functional block diagram for USB file transfer device of the present invention.

What is claimed is:

1. An apparatus for data transfer between two electronic data storage apparatuses, the apparatus comprising:
    (a) a cable housing;
    (b) a cable extending from two points of said cable housing;
    (c) a processor and storage device inside said cable housing, wherein said processor is wired to said cable;
    (d) a first interface at a first end of said cable; and
    (e) a second interface at a second end of said cable;
    wherein, upon insertion of the first interface into a first electronic data storage apparatus and insertion of the second interface into a second electronic data storage apparatus, the apparatus automatically loads and executes drivers and additional software code stored in said storage device onto said first electronic data storage apparatus and said second electronic storage apparatus, wherein said drivers and software code facilitates the direct transfer of data from said first electronic data storage apparatus to said second electronic data storage apparatus and controls the direct transfer and storage of data from said second electronic data storage apparatus to said first electronic storage apparatus.

2. The apparatus according to claim 1, wherein said storage device is flash memory.

3. The apparatus according to claim 1, wherein the apparatus emulates a peripheral storage device.

4. The apparatus according to claim 1, wherein transfer of selected data between the electronic data storage apparatuses is performed using respective existing operating systems of each electronic data storage apparatus.

5. The apparatus according to claim 1, wherein the first interface comprises a Universal Serial Bus (USB) plug.

6. The apparatus according to claim 5, wherein the second interface comprises a Universal Serial Bus (USB) plug.

7. A controller for direct data transfer between two electronic data storage apparatuses, the controller comprising:
    (a) a processor and a storage device, the storage device containing drivers and software code that automatically load and execute on a first electronic data storage apparatus and on a second electronic storage apparatus when the controller is connected to the first and second electronic data storage apparatuses, wherein said drivers and software code facilitate the direct transfer of data from storage on said first electronic data storage apparatus to storage on said second electronic data storage apparatus and facilitate the direct transfer and storage of data from said second electronic data storage apparatus to said first electronic storage apparatus; and
    (b) at least two connectors coupled to said processor.

8. The controller according to claim 7, wherein at least one of said connectors comprises a high-speed data cable coupled to a cable connector.

* * * * *